United States Patent [19]
Coenen et al.

[11] Patent Number: 4,652,686
[45] Date of Patent: Mar. 24, 1987

[54] PROCESS FOR PRODUCING HYDROCARBONS FROM BIOLOGICAL SLUDGE

[75] Inventors: Hubert Coenen; Heinz Effelsberg, both of Essen; Rainer Hagen, Berlin, all of Fed. Rep. of Germany

[73] Assignee: Fried. Krupp Gesellschaft mit beschränkter Haftung, Essen, Fed. Rep. of Germany

[21] Appl. No.: 719,306

[22] Filed: Apr. 2, 1985

[30] Foreign Application Priority Data

Apr. 4, 1984 [DE] Fed. Rep. of Germany ....... 3412536

[51] Int. Cl.$^4$ .............................................. C07C 1/00
[52] U.S. Cl. .................................... 585/240; 201/2.5; 201/25; 48/197 A
[58] Field of Search .................. 585/240, 250; 208/10, 208/13; 48/197 A; 210/761–763, 603; 201/2.5, 25

[56] References Cited

U.S. PATENT DOCUMENTS

| | | | |
|---|---|---|---|
| 3,936,353 | 2/1976 | Chen | 585/240 |
| 3,964,993 | 6/1976 | Romine | 585/240 |
| 3,972,811 | 8/1976 | Larkins, Jr. et al. | 48/197 A |
| 4,097,378 | 6/1978 | St. Clair | 208/13 |
| 4,165,289 | 8/1979 | Borst | 210/679 |
| 4,266,083 | 5/1981 | Huang | 585/240 |
| 4,271,326 | 6/1981 | Mego | 201/2.5 |
| 4,274,839 | 6/1981 | Leas | 48/197 A |
| 4,289,625 | 9/1981 | Tarman et al. | 48/197 A |
| 4,300,009 | 11/1981 | Haag et al. | 585/240 |
| 4,344,770 | 8/1982 | Capener et al. | 201/2.5 |
| 4,448,589 | 5/1984 | Fan et al. | 48/197 A |

Primary Examiner—Andrew H. Metz
Assistant Examiner—Anthony McFarlane
Attorney, Agent, or Firm—Spencer & Frank

[57] ABSTRACT

A process for producing hydrocarbons from biological sludge, wherein the sludge is treated at a temperature of from 300° to 600° C. and at a pressure of from 100 to 500 bar to cause cracking of the organic compounds present in the sludge, the sludge is simultaneously or immediately thereafter hydrogenated with hydrogen under the same pressure and temperature conditions in the presence of a catalyst, and thereafter the resulting gas phase is separated into its components by stepwise reduction of pressure and/or temperature; thereby disposing of the biological sludge without environmental damage and with the simultaneous recovery of hydrocarbons.

7 Claims, 2 Drawing Figures

PROCESS FOR PRODUCING HYDROCARBONS FROM BIOLOGICAL SLUDGE

BACKGROUND OF THE INVENTION

The present invention relates to a process for producing hydrocarbons from biological waste treatment sludge, particularly the fresh activated sludge separated from treated waste water in clarification processes, often referred to as secondary sludge. Other biological sludges, such as primary sedimentation sludge, digested sludge and anaerobic sludge, may also be treated according to this process. Among the hydrocarbons that can be produced by the method of this invention are the alkanes, cycloalkanes and aromatics, whose molecules contain from 1 to about 36 carbon atoms. These gaseous and liquid hydrocarbons are used, primarily, as fuels and chemical process raw feed stocks.

Biological sludge is produced in the biological treatment of waste water and comprises a mixture of water, dead and living microorganisms, and organic as well as inorganic solid particles. Biological sludge has a water content of about 96 to 98.5 percent by weight and can be dewatered using conventioal methods, such as sedimentation, long-term storage, digestion and filtration, the result being a biological sludge, depending on the dewatering process employed, which has a water content of from 70 to 95 percent by weight. It is necessary to dispose of biological sludge without an adverse environmental impact, which may be accomplished by proper storage, composting, agricultural use, or combination. However, each one of these methods has certain drawbacks and it was, therefore, necessary to discover new ways to dispose of biological sludges without environmental damage.

A process is already known for the recovery of hydrocarbons from biological sludges through decomposition in closed containers, in the absence of oxygen, using anaerobic microorganisms. This industrially performed decomposition process, anaerobic digestion, produces primarily methane as its product. However, it is a process subject to frequent malfunction which yields a relatively small amount of hydrocarbons with respect to the carbon contained in the biological sludge. Moreover, the decomposition process produces a large quantity of digested sludge as residue which also requires disposal.

SUMMARY OF THE INVENTION

It is, therefore, an object of the present invention to provide a process for recovering hydrocarbons from biological sludges with a high yield of hydrocarbons, which is economical and reliable in operation, which can be used for bilogical sludges of the most varied origins, and which results in only a small quantity of waste products.

This is accomplished by treating biological sludge, having a water content of 70 to 98.5 weight percent, at a temperature from 300° to 600° C. and at a pressure of 100 to 500 bar. Simultaneously with or immediately after this treatment, at the same pressure and temperature, the sludge is hydrogenated in the presence of a catalyst, with the hydrogen being present in an amount of 2 to 25 weight percent with respect to the carbon content of the biological sludge employed. The reaction period for pressure-temperature treatment and the hydrogenation is 2 to 120 minutes. After hydrogenation the gas phase is separated into its components, which are available in several fractions, by stepwise pressure reduction, temperature reduction, or both.

At temperatures of 300° to 600° C. and pressures of 100 to 500 bar the organic compounds present in the biological sludge are cracked. Due to the existing high pressure, the products of cracking are substantially dissovled in the water vapor present, which avoids further coking [carbonization] of the decomposition products. The water contained in the biological sludge is thus used advantageously as solvent for the gaseous and liquid sludge decomposition products released during pressure-temperature treatment. The catalytic hydrogenation provided by the invention results in the conversion of the unstable unsaturated hydrocarbons developed during the pressure-temperature treatment to the respective, more stable, saturated hydrocarbons. The gas phase existing after hydrogenation, consisting of water, hydrogen and hydrocarbons, may be separated into its components by the stepwise reduction of pressure, temperature, or both, resulting in liquid and gaseous hydrocarbons in addition to water. The hydrocarbon yield of this process is very high, amounting in the conversion of up to 80 weight percent of the carbon in the biological sludge to hydrocarbons.

The process of the present invention produces residue comprising a solid suspension which can be separated into its component parts by sedimentation or filtration. The separated solid particles have only a slight residual water content and can be stored without difficulty in a suitable depository. The liquid separated from the solids is mixed with the water obtained during separation of the gas phase and is subjected to further purification (e.g. treatment with activated carbon and neutralization). Thus, the process of the present invention both makes use of the valuable constituents of biological sludge and disposes of the waste products in a harmless and simple manner. Water obtained from this process may be recycled to the waste water treatment process units when biological sludges from waste treatment plants are being treated on site.

According to the present invention, in connection with the simultaneous performance of pressure-temperature treatment and hydrogenation, at least one compound selected from NaOH, KOH, $Na_4SiO_4$, $NaBO_2$ and $KBO_2$ may be used as catalyst, preferably in an amount of from 0.001 to 0.5 percent by weight with respect to the water contained in the biological sludge. Since the catalyst becomes dissolved in the water or in the water vapor phase, it is homogenously distributed throughout the reaction system and has, therefore, a particularly great effect.

The present invention provides an alternative according to which, after the pressure-temperature treatment of the biological sludge, the water vapor phase charged with the products of cracking is separated, mixed with hydrogen and conducted over a fixed bed catalyst composed of an acid component and a redox component. Preferably $Al_2O_3$, $SiO_2$, $Fe_2O_3$ and/or zeolites are used as the acid components, and $MoO_3$ with $CoO$ and/or $WO_3$ with $NiO$ are used as the redox components. As the fixed bed catalyst is only very slightly damaged by the sulfur and nitrogen compounds contained in the water vapor phase, and no solid carbon or carbon compounds are deposited on the catalyst particles, the fixed bed catalyst has an advantageously long service life.

After cracking and hydrogenation, the reaction mixture may be advantageously separated into fractions by reducing the pressure and temperature of the gas phase to 2 to 10 bar and 150° to 200° C., respectively, whereby an oil fraction is separated from the gas phase. By reducing the pressure to 1 bar and its temperature to 25° C., a water-raw gasoline fraction may be separated, while a hydrocarbon containing gas is simultaneously developed. The water/raw gasoline fraction can be separted by decanting. The separation of the gas phase according to the present invention results, advantageously, in the separation of three hydrocarbon fractions which can be separated further according to known methods, or processed further individually.

The invention will now be described in greater detail with reference to the drawings.

DESCRIPTION OF THE PREFERRED EMBODIMENTS

Figure 1:
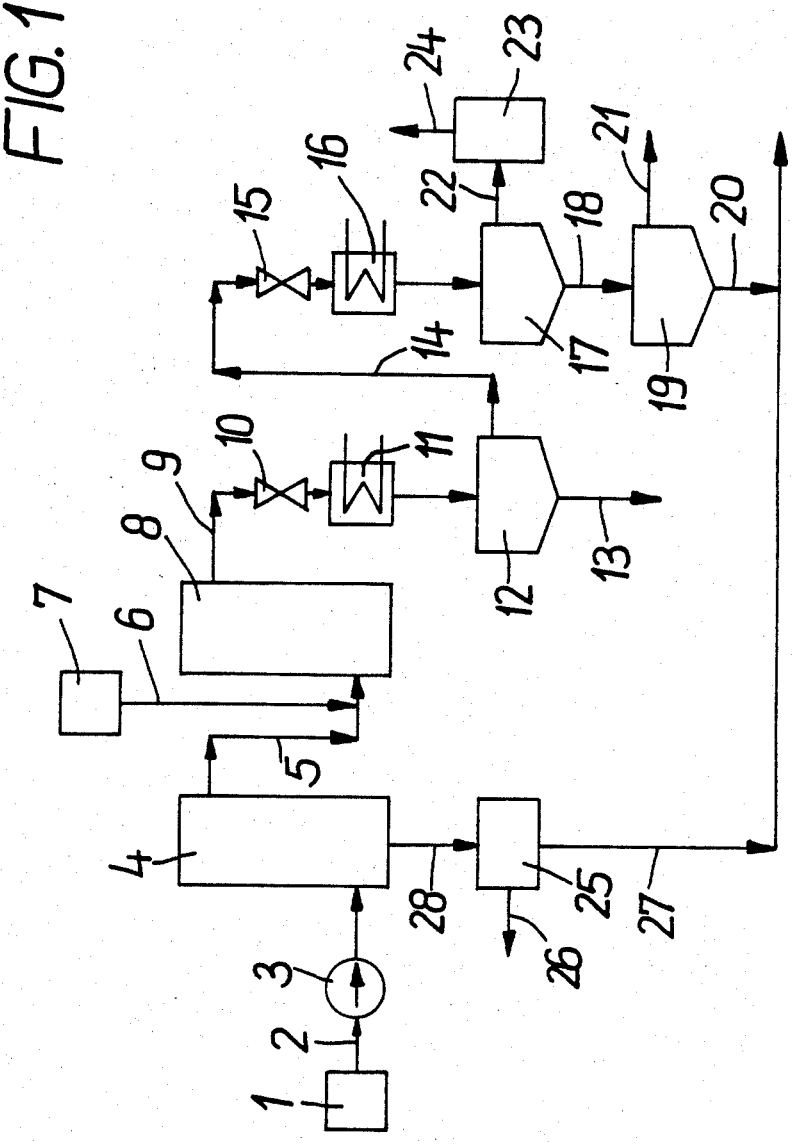
FIG. 1 is a flow chart for the process according to the present invention in the embodiment which operates with separate pressure-temperature treatment and hydrogenation process units.

In the process shown in FIG. 1, the biological sludge is conveyed from reservoir 1 through conduit 2 and pressure pump 3 into the heated reactor 4. The biological sludge, having a water content of 70 to 98.5 weight percent, is subjected to a temperature from 300° to 600° C. and a pressure from 100 to 500 bar for approximately 2 to 120 minutes in reactor 4. The water vapor phase is conducted through conduit 5 into hydrogenation reactor 8 which contains a fixed bed catalyst. Conduit 5 receives hydrogen via line 6 from reservoir 7. The same pressure and temperature conditions as in reactor 4 are maintained in hydrogenation reactor 8, with certain system-specific pressure and temperature fluctuations being possible. The catalyst accelerates cracking as well as the hydrogenation reactions. The gas phase remains in hydrogenation reactor 8 for a period of about 1 to 30 minutes.

The gas phase containing hydrogen is conducted through conduit 9, expansion valve 10 and heat exchanger 11, whereby the pressure is reduced to 2 to 10 bar and the temperature to 150° to 250° C., to separator 12. An oil fraction is obtained from the gas phase in separator 12, and removed through conduit 13. The oil fraction may be either burned to produce energy or separated into its components by distillation. From separator 12, the gas phase is transported through conduit 14, expansion valve 15 and heat exchanger 16, whereby its pressure is reduced to 1 bar and its temperature to 25° C. (normal conditions), to separator 17. In separator 17 a water-raw gasoline fraction is obtained, which is conducted through conduit 18 into separator 19. In separator 19 the gasoline phase is separated from the water. The gasoline discharges through conduit 21 and is either burned to produce energy or purified by distillation. The water exits through conduit 20. The gas phase obtained in separator 17 contains gaseous hydrocarbons and hydrogen, and is conveyed through conduit 22 into gas purification device 23, where $NH_3$ and $H_2S$ are removed. The purified gas exits through conduit 24 and may be separated into its components by distillation or burned to produce energy.

From reactor 4, the residue containing water and solids is conducted through conduit 28 into separator 25, which may be a decanter or a drum filter. The water is separated from the residue and discharged through conduit 27, combined with the water obtained in separator 19 and subjected to a subsequent purification process (e.g., adsorptive treatment with activated carbon and possibly neutralization). Thereafter it is discharged into the sewer system or a drainage ditch. The solids obtained in separator 25 are transported through conduit 26 to a suitable depository.

Figure 2:
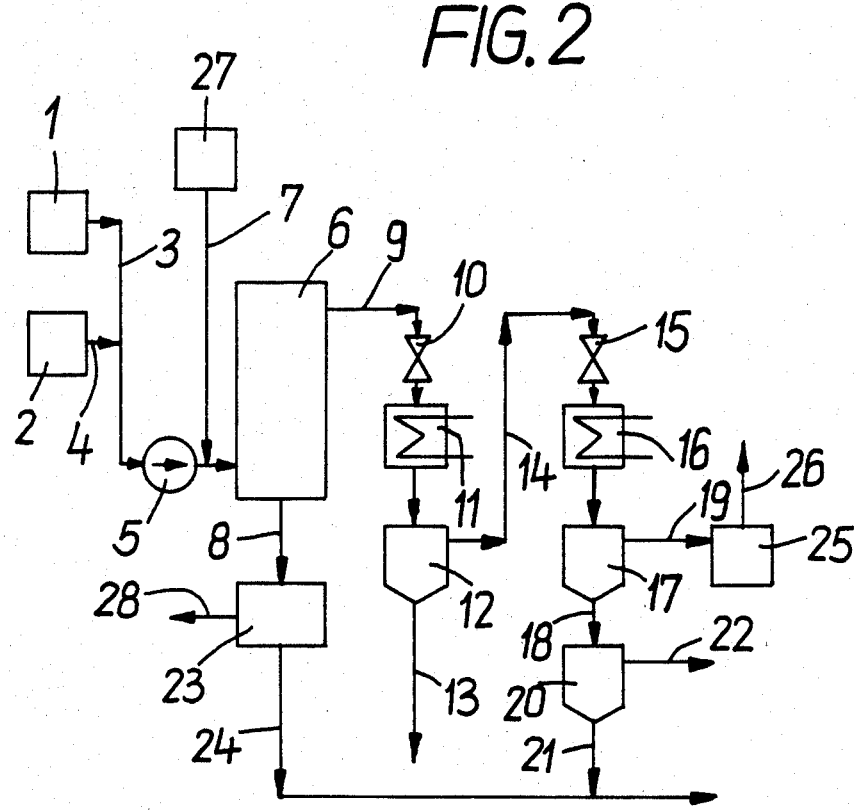
FIG. 2 is a flow chart for the process according to the present invention operating with simultaneous pressure-temperature treatment and hdyrogenation in the same process unit.

In the process shown in FIG. 2, biological sludge is conveyed from reservoir 1 through conduit 3 and pressure pump 5 into reactor 6. From tank 2, through conduit 7, at least one catalyst selected from among NaOH, KOH, $Na_4SiO_4$, $NaBO_2$ and $KBO_2$ is added to the biological sludge in an amount of from 0.001 to 0.5 weight percent with respect to the water contained in the biological sludge. These compounds, which act as cracking and hydrogenation catalysts, may be added to the sludge in the form of aqueous solutions or as solids. From tank 27, through conduit 7, hydrogen is mixed into the sludge. The biological sludge remains in reactor 6 for from 2 to 120 minutes under a pressure of from 100 to 500 bar and at a temperature of from 300° to 600° C.

From reactor 6, a water vapor phase containing both hydrogen and hydrocarbons is transported through conduit 9, expansion valve 10 and heat exchanger 11, whereby its pressure is reduced to 2 to 10 bar and its temperature is reduced to 150° to 250° C. to separator 12. In separator 12 an oil fraction is precipitated from the water vapor phase and discharged through conduit 13. The oil fraction may be either burned to produce energy or separated into its components by distillation. From separator 12, the gas phase is transported through conduit 14, expansion valve 15 and heat exchanger 16, whereby its pressure is reduced to 1 bar and its temperature is reduced to 25° C. (normal conditions), to separator 17. In separator 17 a water-raw gasoline fraction is condensed from the gas phase. The water-raw gasoline fraction flows through conduit 18 into separator 20, wherein the water is separated from the gasoline fraction and discharged through conduit 21, while the raw gasoline leaves separator 20 through conduit 22. The water obtained in separator 20 may still contain a certain quantity of catalyst. The gas phase obtained in separator 17, which contains $H_2S$ and $NH_3$ in addition to hydrogen and gaseous hydrocarbons, is transported through conduit 19 into gas purification device 25, where $NH_3$ and $H_2S$ are removed. The gas composed of hydrogen and gaseous hydrocarbons leaves gas purification device 25 through conduit 26 and may be burned to produce energy or separated into its components by distillation. The gasoline fraction flowing out of conduit 22 may also be purified by distillation.

From reactor 6, a residue composed of water and solids is transported through conduit 8 into separator 23, which may be a decanter or a drum filter. In separator 23, the water is separated from the solid particles and passes through conduit 24 to a subsequent purification process (e.g., activated carbon treatment and, possibly, neutralization). The water obtained in separators 23 and 20 is mixed and conducted into the post-treatment system before it is introduced into a drainage ditch or the sewer system.

EXAMPLE 1

Biological sludge treated according to the process of FIG. 2 had a water content of 98.12 weight percent and a carbon content of 0.81 weight percent. A pressure of 500 bar and a temperature of 400° C. existed in reactor 6. $Na_4SiO_4$ was added as catalyst to the sludge in a quantity of 0.5 weight percent with respect to the water content of the sludge. After a reaction period of 30 minutes, three hydrocarbon containing fractions were separated from the supercritical gas phase. The oil fraction was obtained at 2 bar and 150° C., while the gasoline fraction and the gaseous hydrocarbon fractions were obtained under normal conditions. 72.6 weight percent of the carbon employed was recovered as hydrocarbons in the three fractions, with the following yields being obtained:

oil fraction ($C_{10}$–$C_{36}$): 34.3 weight %
gasoline fraction ($C_6$–$C_9$): 2.1 weight %
gaseous hydrocarbons ($C_1$–$C_5$): 36.2 weight %

Approximately 20 weight percent hydrogen, with reference to the carbon content of the sludge, was present in reactor 6.

EXAMPLE 2

Biological sludge treated according to the process of FIG. 2 had a water content of 98.2 weight percent and a carbon content of 0.6 weight percent. A pressure of 460 bar and a temperature of 350° C. existed in reactor 6. After a reaction period of 240 minutes, three hydrocarbon containing fractions were separated from the supercritical gas phase. The oil fraction was obtained at 2 bar and 150° C., while the gasoline fraction and the gaseous hydrocarbon fraction were obtained under normal conditions. 24.4 weight percent of the carbon employed was recovered as hydrocarbons in the three fractions, with the following yields being obtained:

oil fraction ($C_{10}$–$C_{36}$): 19.2 weight %
gasoline fraction ($C_6$–$C_9$): 1.0 weight %
Gaseous hydrocarbons ($C_1$–$C_5$): 4.2 weight %

Approximately 15 weight percent hydrogen, with reference to the carbon content of the sludge, was present in reactor 6.

EXAMPLE 3

Biological sludge treated according to the process of FIG. 2 had a water content of 98.7 weight percent and a carbon content of 0.66 weight percent. A pressure of 430 bar and a temperature of 350° C. existed in reactor 6. Zn was added as catalyst to the sludge in a quantity of 1.0 weight percent with respect to the water contend of the sludge. After a reaction period of 120 minutes, three hydrocarbon containing fractions were separated from the supercritical gas phase. The oil fraction was obtained at 2 bar and 150° C., while the gasoline fraction and the gaseous hydrocarbon fraction were obtained under normal conditions. 29.4. weight percent of the carbon employed was recovered as hydrocarbons in the three fractions, with the following yields being obtained:

oil fractions ($C_{10}$–$C_{36}$): 21.1 weight %
gasoline fraction ($C_6$–$C_9$): 1.0 weight %
gaseous hydrocarbons ($C_1$–$C_5$): 7.2 weight %

EXAMPLE 4

Biological sludge treated according to the process of FIG. 2 had a water content of 97.9 weight percent and a carbon content of 1.07 weight percent. A pressure of 450 bar and a temperature of 450° C. existed in reactor 6. After a reaction period of 180 minutes, three hydrocarbon containing fractions were separated from the supercritical gas phase. The oil fraction was obtained at 2 bar and 150° C., while the gasoline fraction and the gaseous hydrocarbon fraction were obtained under normal conditions. 54.8 weight percent of the carbon employed was recovered as hydrocarbons in the three fractions, with the following yields being obtained.

oil fractions ($C_{10}$–$C_{36}$): 23.2 weight %
gasoline fraction ($C_6$–$C_9$): 2.8 weight %
gaseous hydrogencarbons ($C_1$–$C_5$): 28.8 weight %

Approximately 18 weight percent hydrogen, with reference to the carbon content of the sludge, was present in reactor 6.

EXAMPLE 5

Biological sludge treated according to the process of FIG. 2 had a water content of 98.0 weight percent and a carbon content of 1.2 weight percent. A pressure of 330 bar and a temperature of 450° C. existed in reactor 6. After a reaction period of 150 minutes, three hydrocarbon containing fraction were separated from the supercritical gas phase. The oil fraction was obtained at 2 bar and 150° C., while the gasoline fraction and the gaseous hydrocarbon fraction were obtained under normal conditions. 58.7 weight percent of the carbon employed was recovered as hydrocarbons in the three fractions, with the following yields being obtained:

oil fractions ($C_{10}$–$C_{36}$): 30.7 weight %
gasoline fractions ($C_6$–$C_9$): 2.3 weight %
gaseous hydrocarbons ($C_1$–$C_5$): 25.7. weight %

Approximately 20 weight percent hydrogen, with reference to the carbon content of the sludge, was present in reactor 6.

EXAMPLE 6

Biological sludge treated according to the process of FIG. 2 had a water content of 98.4 weight percent and a carbon content of 0.91 weight percent. A pressure of 450 bar and a temperature of 450° C. existed in reactor 6. $SiO_2$ was added as catalyst to the sludge in a quantity of 0.9 weight percent with respect to the water content of the sludge. After a reaction period of 240 minutes, three hydrocarbon containing fraction were separated from the supercritical gas phase. The oil fraction was obtained at 2 bar and 150° C., while the gasoline fraction and the gaseous hydrocarbon fraction were obtained under normal conditions. 53.4 weight percent of the carbon employed was recovered as hydrocarbons in the three fractions, with the following yields being obtained:

oil fraction ($C_{10}$–$C_{36}$): 19.4 weight %
gasoline fraction ($C_6$–$C_9$): 1.6 weight %
gaseous hydrocarbons ($C_1$–$C_5$): 32.4 weight %

Approximately 25 weight percent hydrogen, with reference to the carbon content of the sludge, was present in reactor 6.

EXAMPLE 7

Biological sludge treated according to the process of FIG. 2 had a water content of 98.5 weight percent and a carbon content of 0.9 weight percent. A pressure of 500 bar and a temperature of 400° C. existed in reactor 6. Zn was added as catalyst to the sludge in a quantity of 1.0 weight percent and $SiO_2$ was added in aquantity of 0.9 weight percent with respect to the water content of the sludge. After a reaction period of 30 minutes, three hydrocarbon containing fraction were separated from the supercritical gas phase. The oil fraction was obtained at 2 bar and 150° C., while the gasoline fraction and the gaseous hydrocarbon fraction were obtained under normal conditions. 70.3 weight percent of the carbon employed was recovered as hydrocarbons in the three fractions, with the following yields being obtained:

oil fraction ($C_{10}$–$C_{36}$): 30.3. weight %
gasoline fraction ($C_6$–$C_9$): 2.2 weight %
gaseous hydrocarbons ($C_1$–$C_5$): 37.8 weight %

Approximately 25 weight percent hydrogen, with reference to the carbon content of the sludge, was present in reactor 6.

This invention is illustrated by the embodiments and the example described above. However, it is to be understood that the invention is not to be limited by this description but extends to all embodiments within the scope of the following claims and their equivalents.

What is claimed is:

1. A process for producing hydrocarbons from biological sludge containing carbon and water, comprising:

treating the sludge at a temperature of from 300° to 600° C. and at a pressure of from 100 to 500 bar whereby a charged water vapor phase containing at least one hydrogenatable substance is obtained;

hydrogenating the charged water vapor phase under the same pressure and temperature conditions by mixing same with a quantity of hydrogen ranging from 2 to 25 weight percent of the carbon present in the sludge being treated and conducting the mixture over a fixed bed catalyst, the fixed bed catalyst being comprised of an acid component and a redox component, wherein the acid component is at least one compound selected from among $Al_2O_3$, $SiO_2$, $Fe_2O_3$ and zeolite, and the redox component is at least one pair of compounds selected from among $MoO_3$ with CoO and $WO_3$ with NiO, and a total reaction time for the pressure-temperature treatment and hydrogenation being from 2 to 120 minutes and taking place as successive process steps, whereby a gas phase containing hydrogen, hydrocarbons and water is produced; and separating the gas phase into its components by reducing the pressure or temperature, or reducing both the pressure and temperature, said components being obtained in a plurality of fractions.

2. The process of claim 1, wherein an oil fraction is separated from the gas phase by reducing the pressure and temperature of the gas phase to 2 to 10 bar and 150° to 250° C., respectively, and a water-raw gasoline fraction is separated from the gas phase by further reducing its pressure and temperature to 1 bar and 25° C., with a hydrocarbon containing gas being simultaneously obtained.

3. The process of claim 1, wherein the biological sludge has a water content of about 70 to 98.5 weight percent.

4. A process for producing hydrocarbons from biological sludge containing carbon and water, comprising:

treating the sludge at a temperature of from 300° to 600° C. and at a pressure of from 100 to 500 bar, and simultaneously hydrogenating the sludge in the presence of a catalyst with a quantity of hydrogen ranging from 2 to 25 weight percent of the carbon present in the sludge being treated, the catalyst being at least one compound selected from among NaOH, KOH, $Na_4SiO_4$, $NaBO_2$ and $KBO_2$ and being used in an amount of from 0.001 to 0.5 weight percent with respect to the water contained in the sludge, a total reaction time for the pressure-temperature treatment and hydrogenation being from 2 to 120 minutes, whereby a gas phase containing hydrogen, hydrocarbons and water is produced; and separating the gas phase into its components by reducing the pressure or temperature, or reducing both the pressure and temperature, said components being obtained in a plurality of fractions.

5. A process for producing hydrocarbons from biological sludge containing carbon and having a water content of from about 70 to about 98.5 weight percent, comprising:

treating the sludge at a temperature of from 300° C. to 600° C. and at a pressure of from 100 to 500 bar whereby a charged water vapor phase containing at least one hydrogenatable is obtained;

hydrogenating the charged water vapor phase under the same pressure and temperature conditions by mixing same with a quantity of hydrogen ranging from 2 to 25 weight percent of the carbon present in the sludge being treated and conducting the mixture over a fixed bed catalyst, the fixed bed catalyst being comprised of an acid component and a redox component, wherein the acid component is at least one compound selected from among $Al_2O_3$, $SiO_2$, $Fe_2O_3$ and zeolite, and the redox component is at least one pair of compounds selected from among $MoO_3$ with CoO and $WO_3$ with NiO, and a total reaction time for the pressure-temperature treatment and hydrogenation being from 2 to 120 minutes and taking place as successive process steps, whereby a gas phase containing hydrogen, hydrocarbons and water is produced; and separating the gas phase into its components by reducing the pressure or temperature, or reducing both the pressure and temperature, said components being obtained in a plurality of fractions.

6. The process of claim 5, wherein an oil fraction is separated from the gas phase by reducing the pressure of the gas phase to 2 to 10 bar and reducing the temperature of the gas phase to 150° to 250° C., and a water-raw gasoline fraction is separated from the gas phase by further reducing its pressure and temperature to 1 bar and 25° C., with a hydrocarbon containing gas being simultaneously obtained.

7. A process for producing hydrocarbons from biological sludge containing carbon and having a water content of from about 70 to about 98.5 weight percent, comprising:

treating the sludge at a temperature of from 300° C. to 600° C. and at a pressure of from 100 to 500 bar, and simultaneously hydrogenating the sludge in the presence of a catalyst with a quantity of hydrogen ranging from 2 to 25 weight percent of the carbon present in the sludge being treated, the catalyst being at least one compound selected from among NaOH, KOH, $Na_4SiO_4$, $NaBO_2$ and $KBO_2$, said catalyst being present in an amount of from 0.001 to 0.5 weight percent with respect to the water contained in the sludge, a total reaction time for the pressure-temperature treatment and hydrogenation being from 2 to 120 minutes, whereby a gas phase containing hydrogen, hydrocarbons and water is produced; and separating the gas phase into its components by reducing the pressure or temperature, or reducing both the pressure and temperature, said components being obtained in a plurality of fractions.

* * * * *